(12) United States Patent
Son (10) Patent No.: US 7,076,605 B1
(45) Date of Patent: Jul. 11, 2006

(54) METHOD AND APPARATUS FOR WRITING DATA TO A STORAGE DEVICE

(75) Inventor: Keith Son, Hayward, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 258 days.

(21) Appl. No.: 10/423,728

(22) Filed: Apr. 25, 2003

(51) Int. Cl.
*G06F 12/00* (2006.01)

(52) U.S. Cl. ................................. 711/113; 711/167

(58) Field of Classification Search ............... 711/113, 711/167, 163, 112, 170
See application file for complete search history.

(56) References Cited

U.S. PATENT DOCUMENTS

| | | | | |
|---|---|---|---|---|
| 6,044,436 A * | 3/2000 | Otsuka | ........................ | 711/112 |
| 6,148,367 A * | 11/2000 | Tsuboi et al. | ................ | 711/113 |
| 6,253,279 B1 * | 6/2001 | Ng | ................................ | 711/107 |
| 6,549,977 B1 * | 4/2003 | Horst et al. | ................... | 711/113 |
| 6,782,449 B1 * | 8/2004 | Codilian et al. | ............. | 711/113 |
| 2003/0093640 A1 * | 5/2003 | Mowery et al. | ............. | 711/167 |
| 2003/0196031 A1 * | 10/2003 | Chen | ........................... | 711/104 |
| 2003/0212865 A1 * | 11/2003 | Hicken et al. | ............... | 711/135 |
| 2004/0088485 A1 * | 5/2004 | Shang | ......................... | 711/114 |

* cited by examiner

*Primary Examiner*—Pierre-Michel Bataille
(74) *Attorney, Agent, or Firm*—Blakely, Sokoloff, Taylor & Zafman LLP (57) ABSTRACT

A method of writing data to a storage medium comprises receiving blocks of data to be written to a physical medium of the disk, from a data source and storing the blocks of data in a write cache for the disk. The method further comprises checking the status of a flush criterion that controls when to flush the write cache; flushing the write cache by writing the data in the write cache to the physical medium if the flush criterion is satisfied; and sending a message to the data source to indicate that the blocks of data have been written to the physical medium.

21 Claims, 6 Drawing Sheets

METHOD AND APPARATUS FOR WRITING DATA TO A STORAGE DEVICE

FIELD OF THE INVENTION

This invention relates to the storage of data. In particular, the invention relates to a controller that receives write-data from a data source and commits or writes the write-data to a nonvolatile storage medium such as a disk drive.

BACKGROUND

For the purposes of this specification, the term "disk drive" refers to the hardware that is used to physically store data. Usually, a disk drive comprises a physical medium or disk on which data is stored or written, and an interface to the physical medium. The interface, e.g., the Advanced Technology Attachment (ATA), or the Small Computer System Interface (SCSI) specification defines a command set that may be used by a controller of a host machine to read data from and write data to the disk.

In order to improve performance, most disk drives manufactured today include a write cache which can be selectively enabled or disabled. The write cache is usually an area of temporary volatile storage, e.g., Random Access Memory (RAM), that has a faster access time than the disk of a disk drive. When the write cache is enabled, the controller writes blocks of data received from the data source directly to the write cache and thereafter indicates to the source that the data has been written to the disk. By writing data directly to the write cache, through-put may be increased. At a later time, the controller transfers the data from the write cache to the disk in a process referred to as flushing the write cache or write cache synchronization.

Although writing the data directly to the write cache, as described above, improves through-put, (i.e., the rate at which data can be written to a disk) there is a risk that the data may be lost. For example, if there is a power failure before the write cache is flushed, then data in the write cache would be lost. Therefore, in mission critical applications, and in enterprise applications in general, the controller writes a block of data from the data source to the write cache, and flushes the block of data from the write cache by issuing a flush command which causes the contents of the write cache to be written or flushed to the disk.

In the case where the write cache is disabled altogether, through-put is reduced since the benefit of writing directly to the write cache (which has a faster access time than the disk) is lost. In the case where the controller writes to the write cache and thereafter issues a flush command to flush the write cache, there is a need to regain control of or re-arbitrate a bus connecting the controller to the write cache in order for the controller to issue the flush command. It will be appreciated that some of the performance gain that is achieved by writing to the write cache is lost due to delays incurred by the bus re-arbitration process.

SUMMARY OF THE INVENTION

According to one aspect of the invention there is provided a method for writing data to a nonvolatile storage medium. The method comprises receiving blocks of data to be written to a disk of the nonvolatile storage medium, from a data source; storing the blocks of data in a write cache for the nonvolatile storage medium; checking the status of a flush criterion that controls when to flush the write cache; flushing the write cache by writing the data in the write cache to the disk if the flush criterion is satisfied; and sending a message to the data source to indicate that the blocks of data have been written to the disk.

DETAILED DESCRIPTION

In the following description, for purposes of explanation, numerous specific details are set forth in order to provide a thorough understanding of the invention. It will be apparent, however, to one skilled in the art, that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
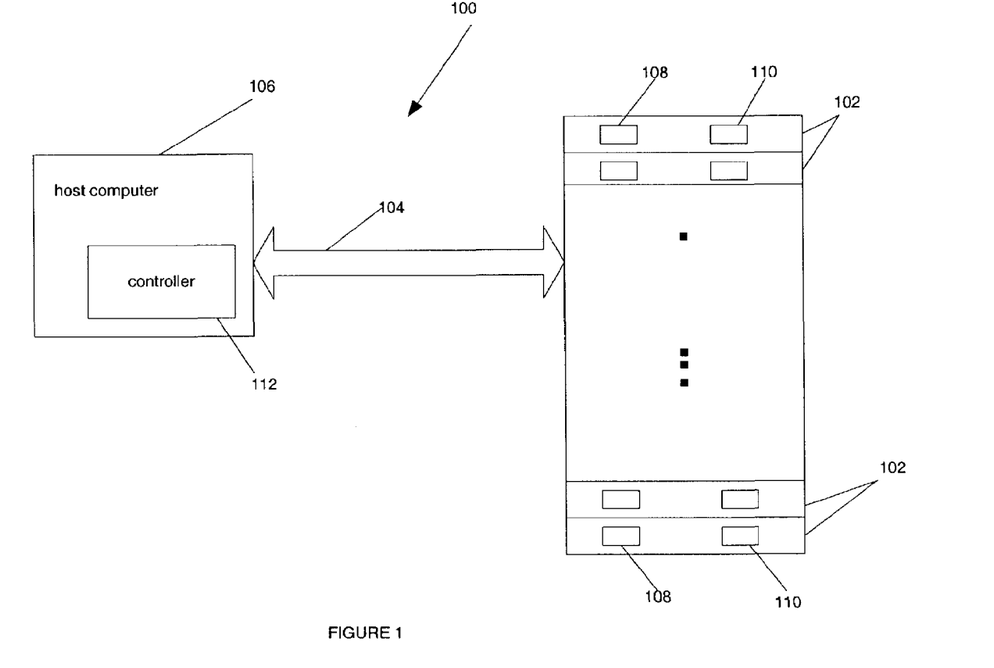
FIG. 1 shows a storage solution in accordance with the prior art.

FIG. 1 of the drawings shows a storage solution 100 in accordance with the prior art. The storage solution 100 includes a plurality of disk drives 102 located downstream of a data bus 104 which connects the disk drives 102 to a host computer 106.

Each disk drive 102 includes a write cache 108 and a physical medium 110 or disk on which data may be stored. The write cache 108 may comprise volatile Random Access Memory (RAM) components. The host computer 106 includes a controller 112 which is responsible for controlling communications to and from the disk drives 102 across the data bus 104. In one embodiment, the host computer 106 generates the data that is required to be stored on a disk drive 102. In other embodiments, the data may be generated at a node to which the host computer 106 is connected via a network. The disk drives 102 may be located within a Storage Area Network (SAN) or within a Network Attached Storage (NAS) device. Alternatively, the disk drives 102 may form part of a Direct Attached Storage (DAS) device.

In accordance with techniques of the prior art, the controller 112 issues write commands which are carried by the data bus 104 and which cause blocks of data to be written, in one embodiment, directly to the physical medium or disk 110 of a target disk drive 102. In another embodiment, the controller 112 causes a block of data to be written directly to the write cache 108 of the target disk drive 102. Thereafter, the controller 112 issues a flush command to flush data written to the write cache 108 of the target disk drive 102, thus causing the data to be written to the disk 110 of the target disk drive 102.

As described above, the write cache 108 of a disk drive 102 has a faster access time than the disk 110 of the disk drive 110. Thus, by writing blocks of data to the write cache 108, data through-put will be increased. However, in order to prevent data loss, for example due to power failures, it is necessary to periodically flush the write cache 108. This gives rise to the need for the controller 112 to issue a periodic flush command over the data bus 104. Before the periodic flush command may be issued, the controller 112 has to regain control of or re-arbitrate the bus 104. The time taken to re-arbitrate the bus 104 reduces the through-put gain which is due to the usage of the write cache 108.

Figure 2:
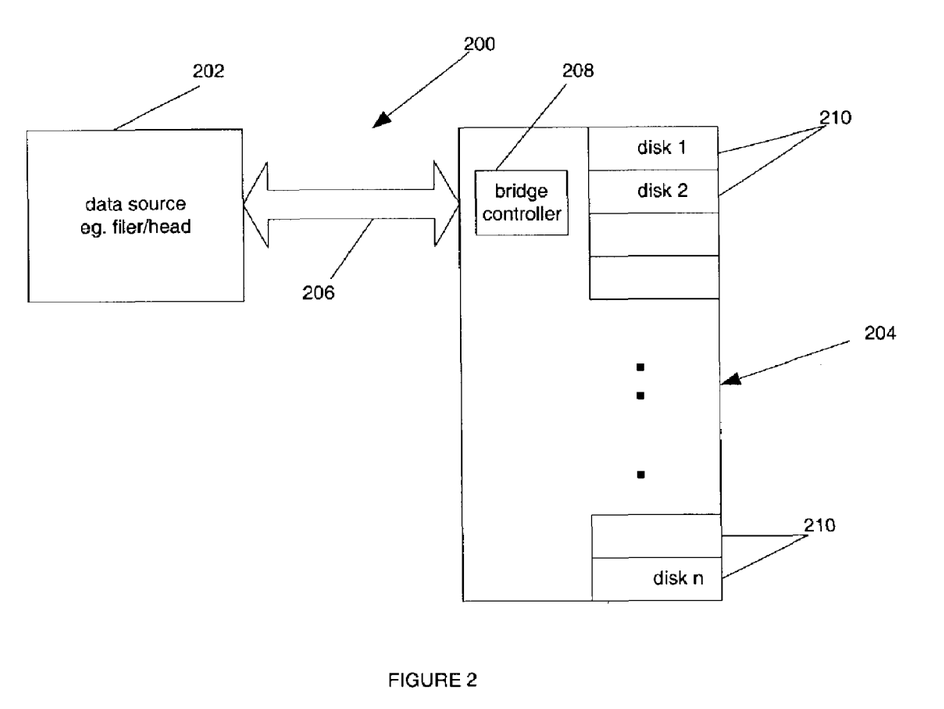
FIG. 2 shows one embodiment of a storage solution in accordance with the invention.

Referring now to FIG. 2 of the drawings, there is shown a storage solution 200 in accordance with one embodiment of the invention. In the storage solution 200, a data source 202 is connected to a storage device 204 via an intermediate data bus 206. The storage device 204 may be implemented within a Storage Area Network (SAN), or within a Network Attached Storage (NAS). Alternatively, the storage device 204 may form part of a Direct Attached Storage (DAS) device. The storage device 204 includes a bridge controller 208 and a plurality of disk drives 210. It will be seen that in the storage solution 200, the data source 202 is located upstream of the bus 206, whereas the bridge controller 208 is located downstream of the bus 206. Each disk drive 210 includes a write cache 212 (see FIG. 3) and a physical medium or disk 214 (see FIG. 3) on which data may be stored. Essentially, the bridge controller 208 receives data to be written or committed to one of the disk drives 210 in a particular data protocol, for example, the SCSI protocol or the Fiber-Channel (FC) protocol, converts the data into a data protocol supported by the disk drives 210, for example the Advanced Technology Attachment (ATA) interface/protocol between host systems and storage devices, and controls how the data is written to the disk drives 210 as will be explained below.

Figure 3:
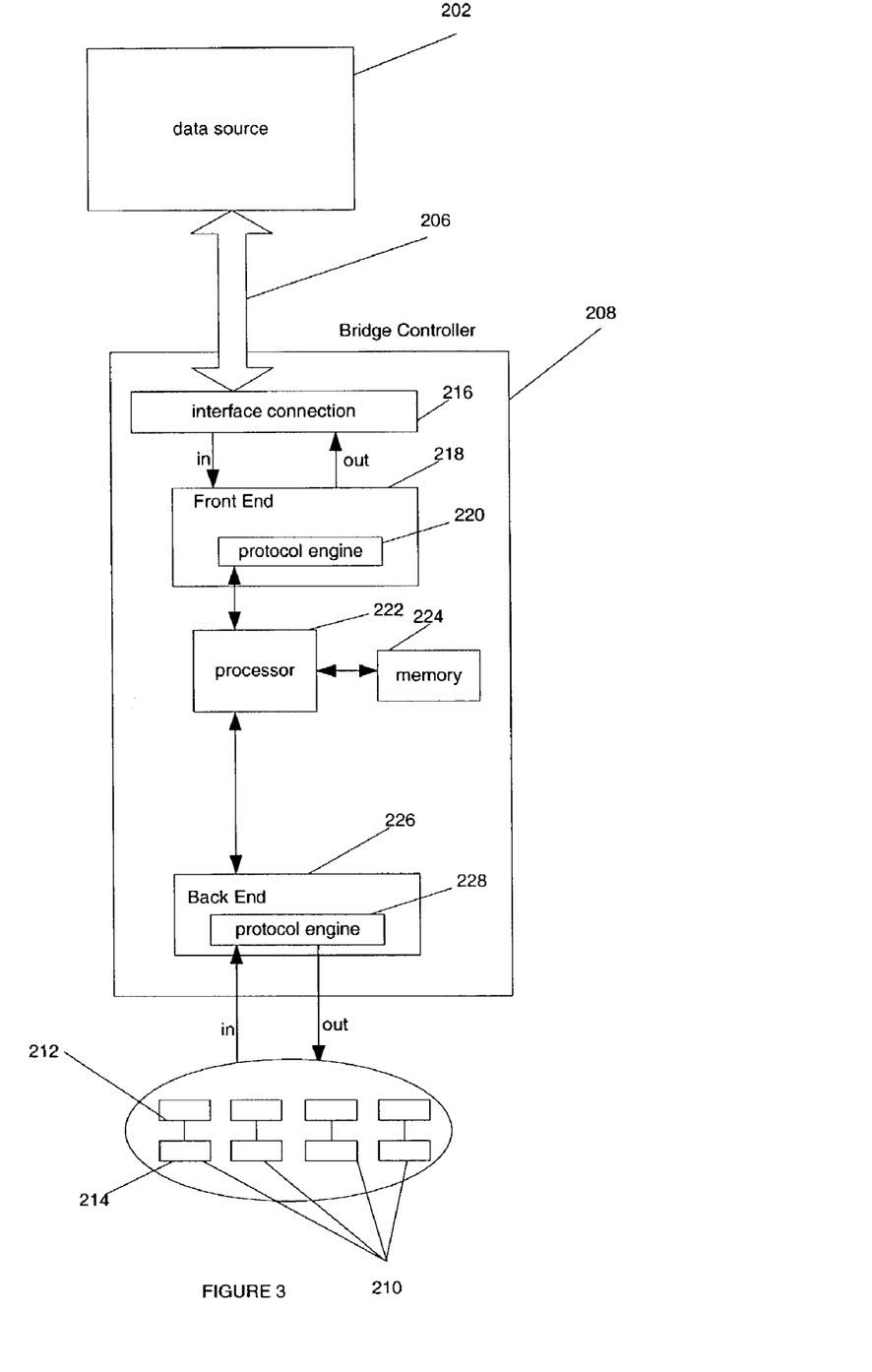
FIG. 3 shows the components of the bridge controller of FIG. 2 in greater detail.

Referring now to FIG. 3 of the drawings, the components of the bridge controller 208 are shown in greater detail. As will be seen, the bridge controller 208 includes an interface connection 216 which interfaces with the data bus 206 to receive and send data transactions from and to the data source 202, respectively. The interface connection 216 is in communication with a front-end 218 which includes a protocol engine 220. The protocol engine 220 provides a mechanism which supports the communications protocol used by the data source 202. The protocol engine 220 sends and receives data from a processor 222 which is coupled to a memory 224. The memory 224 includes software that controls the operation of the bridge controller 208. In particular, the memory 224 includes software that causes the bridge controller 208 to perform the operations described with reference to FIGS. 4–6. The processor 222 communicates with a back-end 226 which includes a protocol engine 228 that supports the protocol used by the disks 210. For example, in one embodiment, the protocol engine 220 may support the SCSI protocol or the FC protocol, whereas the protocol engine 228 may support the Advanced Technology Attachment (ATA) interface/protocol. Other components of the bridge controller 208 which are not germane to the invention and which will be apparent to one skilled in the art are not shown, so as to simplify description.

Figure 4:
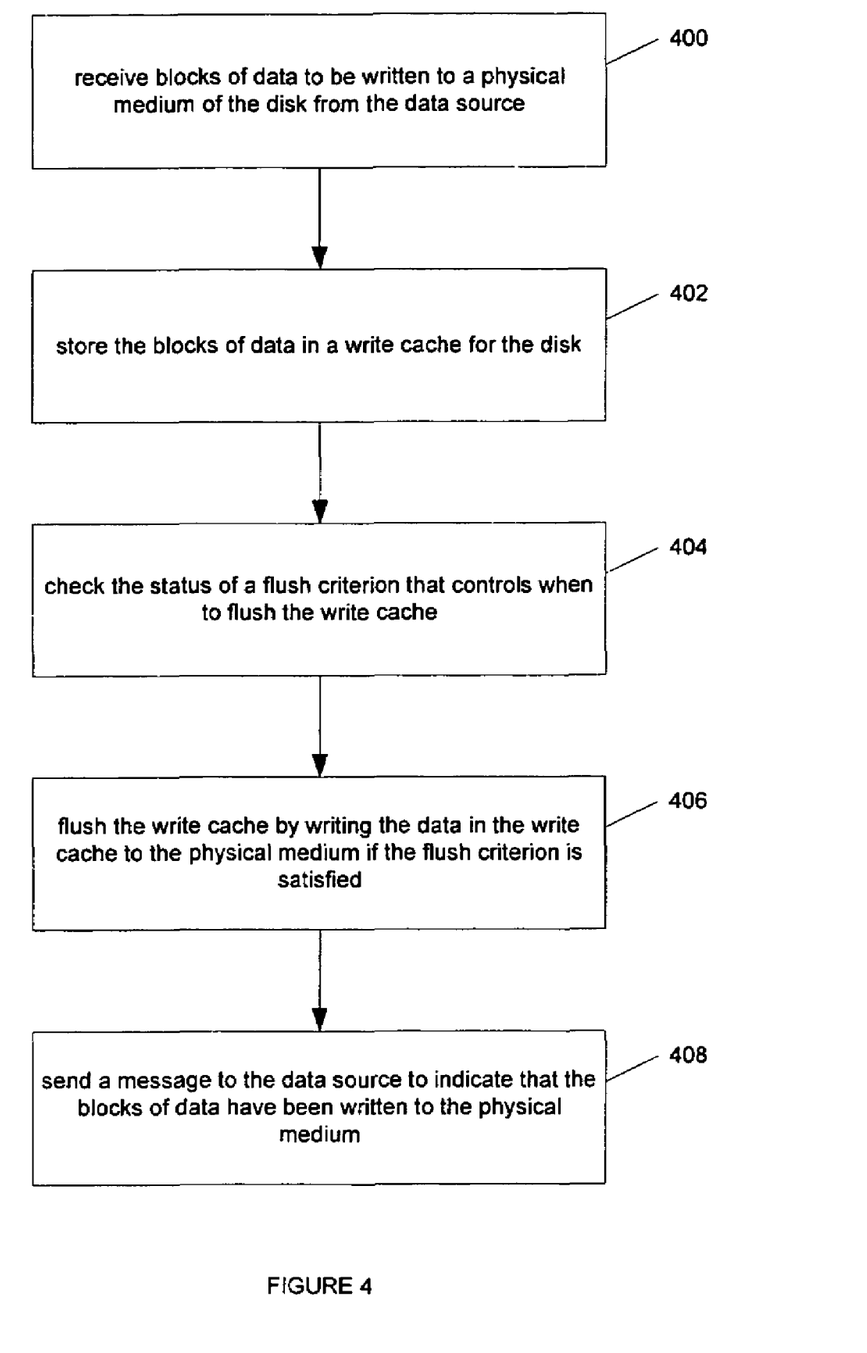
FIGS. 4–6 show flowcharts of operations performed by the controller in accordance with different embodiments of the invention.

FIG. 4 of the drawings shows a flowchart of operations performed by the bridge controller 208, in accordance with one embodiment of the invention. Referring to FIG. 4, at block 400, the bridge controller 208 receives blocks of data to be written to the disk 214 of a disk drive 210. The blocks of data are received from the data source 202 via the bus 206. At block 402, the bridge controller 208 stores the blocks of data in the write cache 212 for a disk drive 210. At block 404, the bridge controller 208 checks the status of a flush criterion that controls when to flush the write cache 212. In one embodiment, the flush criterion is based on parameters associated with the disk drive 210. For example, the parameters may include a time taken for the disk 214 of the disk drive 210 to complete one revolution. The parameters may also comprise a maximum amount of data (N) that can be written to a track of the disk 214 at a current location of a write head of the disk drive 210.

At the block 406, the bridge controller 208 flushes the write cache 212 by writing the data in the write cache 212 to the disk 214 of the disk drive 210 if the flush criterion is satisfied. Since the flush criterion, in one embodiment, includes the time taken for the disk 214 to complete one revolution, the bridge controller 208 implements a timer which is initialized upon receiving a first block of data comprising the blocks of data, and resets the timer whenever the write cache 212 is flushed.

In one embodiment, the bridge controller 208 also maintains a size indicator to indicate a combined size of the blocks of data stored in the write cache 212. In one embodiment, the flush criterion is satisfied when the value of the timer is equal to the time taken for the disk 214 of the disk drive 210 to complete one revolution, or when data stored in the write cache 212 equals the lesser of the maximum amount of data (N), and a storage capacity of the write cache 212.

In one embodiment, the parameters associated with the disk drive 210, such as the time taken for the disk to complete one revolution, and the maximum amount of data that can be written to a track of the disk 214 at a current location of the write head of the disk drive 210 are obtained by user input. In another embodiment, these parameters may be automatically determined. For example, the bridge controller may issue the IDENTIFY DEVICE command of the Advanced Technology Attachment ATA/ATAPI-5 interface specification to the disk drive 210. The IDENTIFY DEVICE command enables the bridge controller 208 to retrieve parameter information from the disk drive 210. The parameter information may include the number of logical sectors per track, and the current track capacity in sectors. The SEEK command of the Advanced Technology Attachment ATA/ATAPI-5 interface specification may be used to determine the access time of the disk drive 210.

It will be seen that the flush criterion is satisfied based on a time component and on a data storage component. The time component is selected to ensure that a flush of the write cache 212 occurs at least once every revolution of the disk 214. The data storage component of the flush criterion ensures that if the write cache 212 is full, the write cache 212 will be flushed. The data storage component also ensures that if the contents of the write cache 212 exceed the amount of data that can be physically stored at a track of the disk 214 corresponding to a current location of the write head, then the contents of the write cache 212 will be flushed.

By selecting when the flush criterion is satisfied, as described above, the number of flush commands issued by the bridge controller 208 to flush the write cache 212 is kept to a minimum and through-put is maximized. At the block 408, a message is sent to the data source to indicate that the blocks of data have been written to the physical medium.

Figure 5:
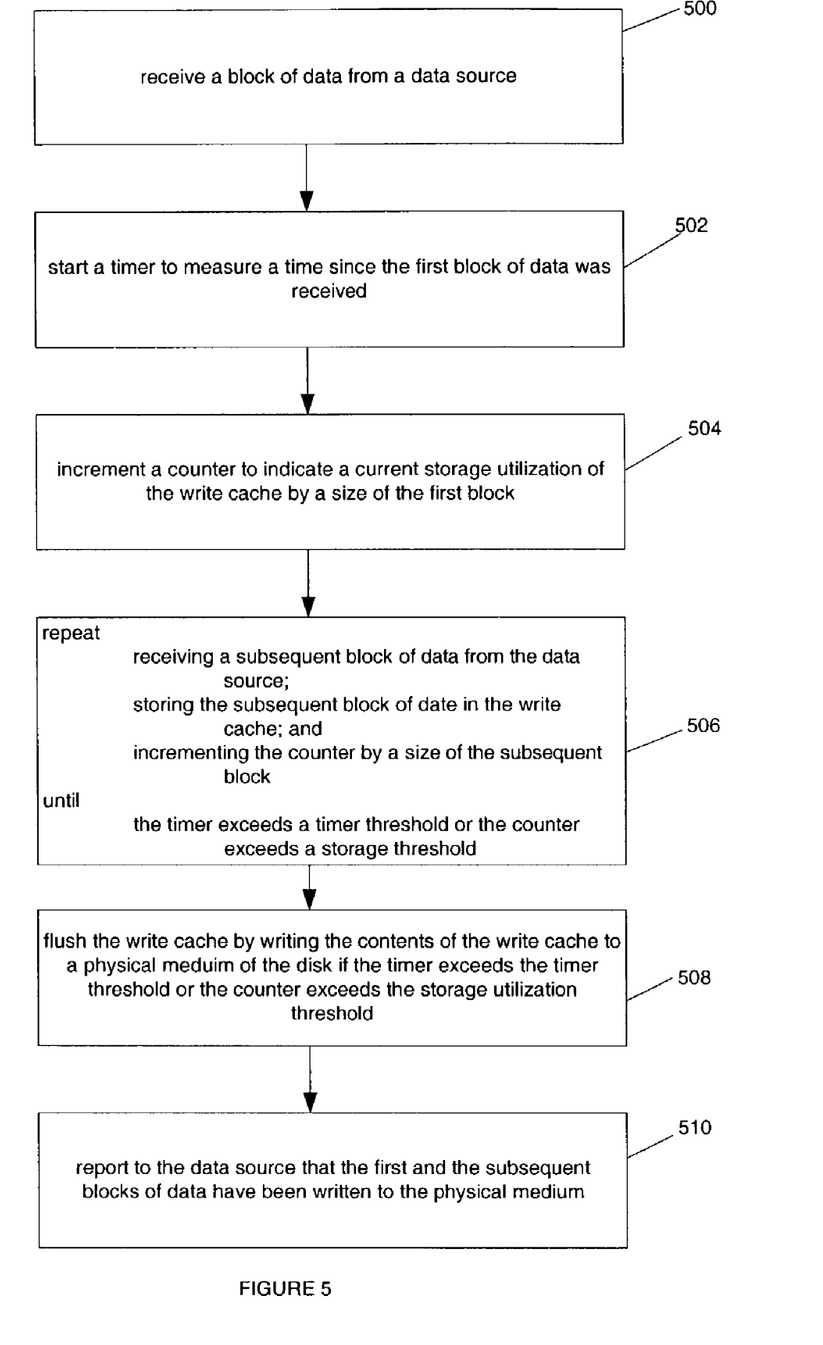

FIG. 5 of the drawings shows a flowchart of operations performed by the bridge controller 208 in accordance with another embodiment of the invention. Referring to FIG. 5, at block 500, the bridge controller 208 receives a block of data from the data source 202. At block 502, the bridge controller 208 starts a timer to measure a time since the first block of data was received. At block 504, the bridge controller 208 increments a counter to indicate the current storage utilization of the write cache 212 by a size of the first block. At block 506, the bridge controller 208 repeats (a) receiving a subsequent block of data from the data source 202, (b) storing the subsequent block of data in the write cache 212 of a disk drive 210, and (c) incrementing a counter by a size of the subsequent block, until the timer exceeds a timer threshold or the counter exceeds a storage threshold.

In one embodiment, the timer threshold equals the time taken for the disk 214 of the disk drive 210 to complete one revolution. Further, the storage threshold equals the maximum amount of data (N) that can be physically stored at a track of the disk 214 corresponding to a current location of a write head of the disk drive 210. The values for the time taken for the disk 214 of the disk drive 210 to complete one revolution, and the maximum amount of data (N) that can be physically stored at the track of the disk 214 corresponding to the current location of the write head of the disk drive 210 may be user input. Alternatively, these values may be determined by the bridge controller 208 in a software transparent fashion, as described above.

At block 508, the bridge controller 208 flushes the write cache 212 by writing the contents of the write cache 212 to the disk 214 of the disk drive 210 if the timer exceeds the timer threshold or the counter exceeds the storage utilization threshold. At block 510, the bridge controller 208 reports to the data source 202 that the first and the subsequent blocks of data have been written to the disk 214.

Figure 6:
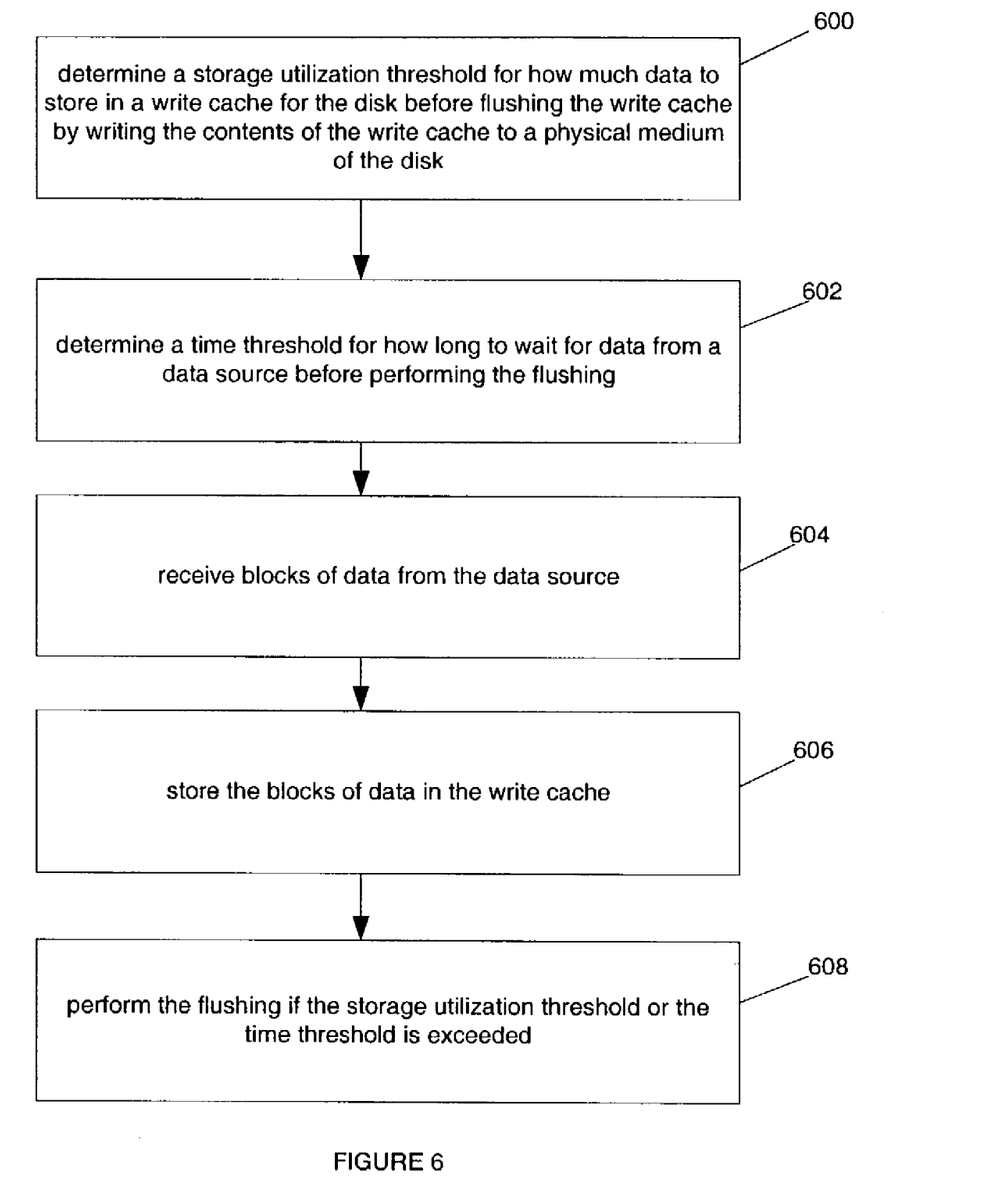

Referring now to FIG. 6 of the drawings, there is shown a flowchart of operations performed by the disk controller 208 in accordance with another embodiment of the invention. Referring to FIG. 6, at block 600, the bridge controller 208 determines a storage utilization threshold for how much data to store in the write cache 212 of the disk drive 210 before flushing the write cache or writing the contents of the write cache 212 to the disk 214 of the disk drive 210. As noted above, the value for the storage utilization threshold may be determined by the bridge controller 208 in a software transparent fashion. At block 602, the bridge controller 208 determines a time threshold for how long to wait for data from the data source 202 before performing the flushing. In one embodiment, this time threshold equals the time taken for the disk 214 of the disk drive 210 to perform one revolution. Further, the storage utilization threshold may be set to equal the maximum amount of data that can be physically stored on a track of the disk 214 corresponding to a current location of a write head of the disk drive 210. At block 604, the bridge controller 208 receives blocks of data from the data source, at block 606, and stores the blocks of data in the write cache 212. At block 608, bridge controller 208 performs the flushing if the storage utilization threshold or the time threshold is exceeded.

Aspects of the present invention also include machine-executable instructions resident on a machine-readable medium to cause a machine (the bridge controller 208) to perform operations described with reference to FIGS. 4–6. Example of a machine-readable medium includes a diskette, CD-ROM, etc.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method for writing to a disk drive comprising:
   receiving data to be written to the disk drive;
   storing the data in a write cache in the disk drive; and
   writing the data stored in the write cache in the disk drive to a disk in the disk drive when the earlier of a time threshold associated with the disk drive or a storage threshold associated with the disk drive is reached.

2. The method of claim 1, wherein the time threshold represents a time required for the disk to complete one revolution.

3. The method of claim 2, further comprising:
   initializing the timer when the data is received; and
   resetting the timer when the data stored in the write cache is written to the disk.

4. The method of claim 1, wherein the storage threshold is reached when a size of the data stored in the write cache is equal to the lesser of a capacity of the write cache or a capacity of the track on the disk.

5. The method of claim 4, further comprising:
   maintaining a size indicator to monitor the size of the data stored in the write cache.

6. The method of claim 1, wherein at least one of the time threshold or the storage threshold is based on information received from the disk drive in response to a command from a bridge controller.

7. The method of claim 6, wherein the information includes at least one of: a number of logical sectors per track, a current track capacity in sectors, or a disk drive access time.

8. The method of claim 1, wherein at least one of the time threshold or the storage threshold is based on information received from user input.

9. The method of claim 1, wherein receiving the data comprises receiving the data in a first protocol and storing the data comprises storing the data in a second protocol, and the method further comprises converting the data in the first protocol to the data in the second protocol.

10. The method of claim 9, wherein the first protocol is selected from the group consisting of a Small Computer System Interface (SCSI) protocol and a Fiber-Channel (FC) protocol, and the second protocol is an Advanced Technology Attachment (ATA) protocol.

11. A method for writing to a disk drive comprising:
    receiving a first set of data blocks to be written to a nonvolatile storage medium in a disk drive;
    storing the first set in a volatile storage medium in the disk drive;
    receiving one or more subsequent sets of data blocks to be written to the nonvolatile storage medium;
    storing the one or more subsequent sets in the volatile storage medium; and
    writing the first set and the one or more subsequent sets of data blocks stored in the volatile storage medium to the nonvolatile storage medium at a rate of at least once per revolution of the nonvolatile storage medium while the volatile storage medium contains data blocks to be written to the nonvolatile storage medium.

12. The method of claim 11, further comprising:
notifying a source of a particular set of data blocks of a completed write operation only after the particular set of data blocks is written to the nonvolatile storage medium.

13. The method of claim 11, wherein the first set and the one or more subsequent sets of data blocks is further written to the nonvolatile storage medium when a combined size of the first set and the one or more subsequent sets of data blocks equals the smaller of a storage capacity of the volatile storage medium or a maximum amount of data that can be written to a track of the nonvolatile storage medium.

14. A storage system comprising:
a data source; and
a storage device coupled to the data source via a data bus, the storage device comprising:
  a bridge controller; and
  a plurality of disk drives coupled to the bridge controller, wherein each disk drive includes a write cache and a disk, and the bridge controller is to write data from the data source to the write cache of at least one of the plurality of disk drives and to write to the corresponding disk contents of the write cache after a flush criterion is satisfied, wherein the flush criterion is based on a property of the disk and is satisfied at least once every revolution of the disk whenever the write cache contains content not yet written to the disk.

15. The storage system of claim 14, wherein the property of the disk is selected from the group consisting of: a rotational speed of the disk, and a storage density of the disk.

16. The storage system of claim 14, wherein the bridge controller comprises:
a first interface to receive, from the data source via the data bus, the data in a first protocol;
a first protocol engine coupled to the first interface, the first protocol engine to support the first protocol;
a processor coupled to the first protocol engine to communicate with the first protocol engine;
a memory coupled to the processor to include instructions controlling the bridge controller; and
a second protocol engine coupled to the processor, the second protocol engine to communicate with the processor and to support a second protocol used by the plurality of disk drives.

17. The system of claim 16, wherein the first protocol is selected from the group consisting of a Small Computer System Interface (SCSI) protocol and a Fiber-Channel (FC) protocol, and the second protocol is an Advanced Technology Attachment (ATA) protocol.

18. A machine-readable medium having stored thereon instructions, which when executed by a machine, cause the machine to perform a method comprising:
receiving data to be stored in a disk of a disk drive;
storing the data in a write cache of the disk drive; and
writing the data stored in the write cache to the disk at a rate of at least once per revolution of the disk to flush the write cache until the write cache is cleared of the data to be stored in the disk.

19. The medium of claim 18, wherein the data stored in the write cache is further written to the disk each time the data stored in the write cache equals a maximum amount of data that can be written to a track of the disk at a current location of a write head of the drive.

20. The medium of claim 18, wherein the data stored in the write cache is further written to the disk each time a storage capacity of the write cache is reached.

21. The medium of claim 18, wherein the data written to the disk is received via a data bus in a single data transaction with a data source.

* * * * *